US010531783B1

(12) United States Patent
Carr et al.

(10) Patent No.: US 10,531,783 B1
(45) Date of Patent: Jan. 14, 2020

(54) MOVABLE CUTLERY BASKET

(71) Applicants: BSH Home Appliances Corporation, Irvine, CA (US); BSH Hausgeräte GmbH, Munich (DE)

(72) Inventors: Casey Carr, New Bern, NC (US); Deborah Harr, New Bern, NC (US)

(73) Assignees: BSH Home Appliances Corporation, Irvine, CA (US); BSH Hausgeräte, Munich (DE)

( * ) Notice: Subject to any disclaimer, the term of this patent is extended or adjusted under 35 U.S.C. 154(b) by 0 days.

(21) Appl. No.: 16/116,961

(22) Filed: Aug. 30, 2018

(51) Int. Cl.
*A47L 15/50* (2006.01)
*F16B 2/22* (2006.01)

(52) U.S. Cl.
CPC .............. *A47L 15/502* (2013.01); *F16B 2/22* (2013.01)

(58) Field of Classification Search
CPC ...... A47L 15/50; A47L 15/502; A47L 15/507; F16B 2/22
USPC ............. 312/228, 228.1, 408, 410; 211/41.8, 211/41.9; 186/46, 49
See application file for complete search history.

(56) References Cited

U.S. PATENT DOCUMENTS

| | | | |
|---|---|---|---|
| 3,192,935 A | 7/1965 | Hanifan | |
| 3,901,355 A * | 8/1975 | Shiraishi | A47F 10/06 186/44 |
| 4,216,845 A * | 8/1980 | Tashman | A47F 10/06 186/49 |
| 4,610,368 A * | 9/1986 | Hasebe | A47L 15/502 220/23.8 |
| 5,431,294 A * | 7/1995 | Stottmann | A47L 15/502 211/181.1 |
| 5,687,752 A * | 11/1997 | Boylan | A47L 15/30 134/115 R |
| 7,862,664 B2 | 1/2011 | Choi et al. | |
| 9,414,737 B2 | 8/2016 | Paschini et al. | |
| 2002/0153021 A1 | 10/2002 | Audet | |
| 2016/0206124 A1* | 7/2016 | Laniado | A47G 23/08 |
| 2017/0224189 A1 | 8/2017 | Kulkarni | |

FOREIGN PATENT DOCUMENTS

| | | |
|---|---|---|
| DE | 8909253 U1 | 9/1989 |
| DE | 102007057510 A1 | 6/2009 |
| WO | 2013098019 A1 | 7/2013 |

* cited by examiner

*Primary Examiner* — James O Hansen
(74) *Attorney, Agent, or Firm* — Michael E. Tschupp; Andre Pallapies; Brandon G. Braun

(57) ABSTRACT

A dishwasher rack includes a frame and a support rail disposed along sides of the frame. A plurality of cutlery baskets are coupled to the rail. Each cutlery basket is movable from a respective first location on the rail to a respective second location on the rail. The cutlery baskets may be removable to enable a user to adjust a ratio of cutlery storage area to crockery storage area as desired. Also, the cutlery baskets may be arranged to revolve along a perimeter of the rack so that a user can load empty baskets at the same location.

9 Claims, 8 Drawing Sheets

MOVABLE CUTLERY BASKET

CROSS-REFERENCE TO RELATED APPLICATIONS

The present application is a divisional application of U.S. patent application Ser. No. 15/472,337, filed on Mar. 29, 2017, the contents of which are herein incorporated by reference in their entirety.

FIELD OF THE TECHNOLOGY

The present technology relates to a dishwashers, and more particularly to cutlery baskets for dishwashers.

BACKGROUND

Known dishwashers have at least one crockery basket for arranging crockery items to be cleaned, where at least one cutlery basket is usually arranged in the crockery basket to accommodate cutlery items to be cleaned. The arrangement of the cutlery basket in the crockery basket often makes it inconvenient to arrange crockery items in the crockery basket. Moreover, there is often insufficient space in the cutlery basket to accommodate all of the cutlery items to be cleaned.

BRIEF SUMMARY

One aspect of the disclosed technology relates to an arrangement of cutlery baskets that increases capacity of a cutlery storage area over conventional cutlery basket arrangements.

Another aspect of the disclosed technology relates to dishwasher rack having at least one cutlery basket arranged to revolve around a perimeter of the rack.

Another aspect of the disclosed technology relates to a dishwasher rack having a plurality of cutlery baskets arranged to revolve around a perimeter of the rack so that a user can load empty baskets at the same location.

Another aspect of the disclosed technology relates to a configurable arrangement of cutlery baskets which enables a user to adjust a ratio of cutlery storage area to crockery storage area as desired.

Another aspect of the disclosed technology relates to a cutlery basket assembly insertable into a dishwasher rack and including a rail along which at least one cutlery basket is moveable.

Another aspect of the disclosed technology relates to a dishwasher rack, comprising a frame including at least two contiguous sides disposed along a perimeter of the rack, the two sides including a first side and a second side; a support rail disposed along the at least two sides of the frame such that the rail includes a first portion corresponding to the first side of the frame and a second portion corresponding to the second side of the frame; and at least one cutlery basket coupled to the rail and arranged to be movable from the first portion of the rail to the second portion of the rail.

Another aspect of the disclosed technology relates to a cutlery basket assembly, comprising a support rail configured to extend along at least a first side and a second side of a dishwasher rack such that the rail includes a first portion corresponding to the first side of the rack and a second portion corresponding to the second side of the rack; and at least one cutlery basket coupled to the rail and arranged to revolve in the rack so as to be movable along the rail from the first portion of the rail to the second portion of the rail.

Other aspects, features, and advantages of this technology will become apparent from the following detailed description when taken in conjunction with the accompanying drawings, which are a part of this disclosure and which illustrate, by way of example, principles of this technology.

BRIEF DESCRIPTION OF THE DRAWINGS

The accompanying drawings facilitate an understanding of the various examples of this technology. In such drawings:

FIGS. 1-2 is a perspective view of the dishwasher of FIG. 1 with the cutlery basket removed;

FIG. 1-3 is a schematic representation of the dishwasher rack of FIG. 1-1;

FIG. 2-1 is a perspective view of a cutlery basket and rail according to an example of the disclosed technology;

FIG. 2-2 is a bottom view of the cutlery basket and rail of FIG. 2-1;

FIG. 2-3 is a bottom view of the cutlery basket of FIG. 2-1 with the rail removed;

FIG. 3 is a perspective view of a cutlery basket and group of carriers in accordance with an example of the disclosed technology;

FIG. 6-1 is a front view of a cutlery basket and rail in accordance with an example of the disclosed technology;

FIG. 6-2 is a side view of the cutlery basket of FIG. 6-1;

DETAILED DESCRIPTION

The following description is provided in relation to several examples which may share common characteristics and features. It is to be understood that one or more features of any one example may be combinable with one or more features of the other examples. In addition, any single feature or combination of features in any of the examples may constitute additional examples.

Figure 1:
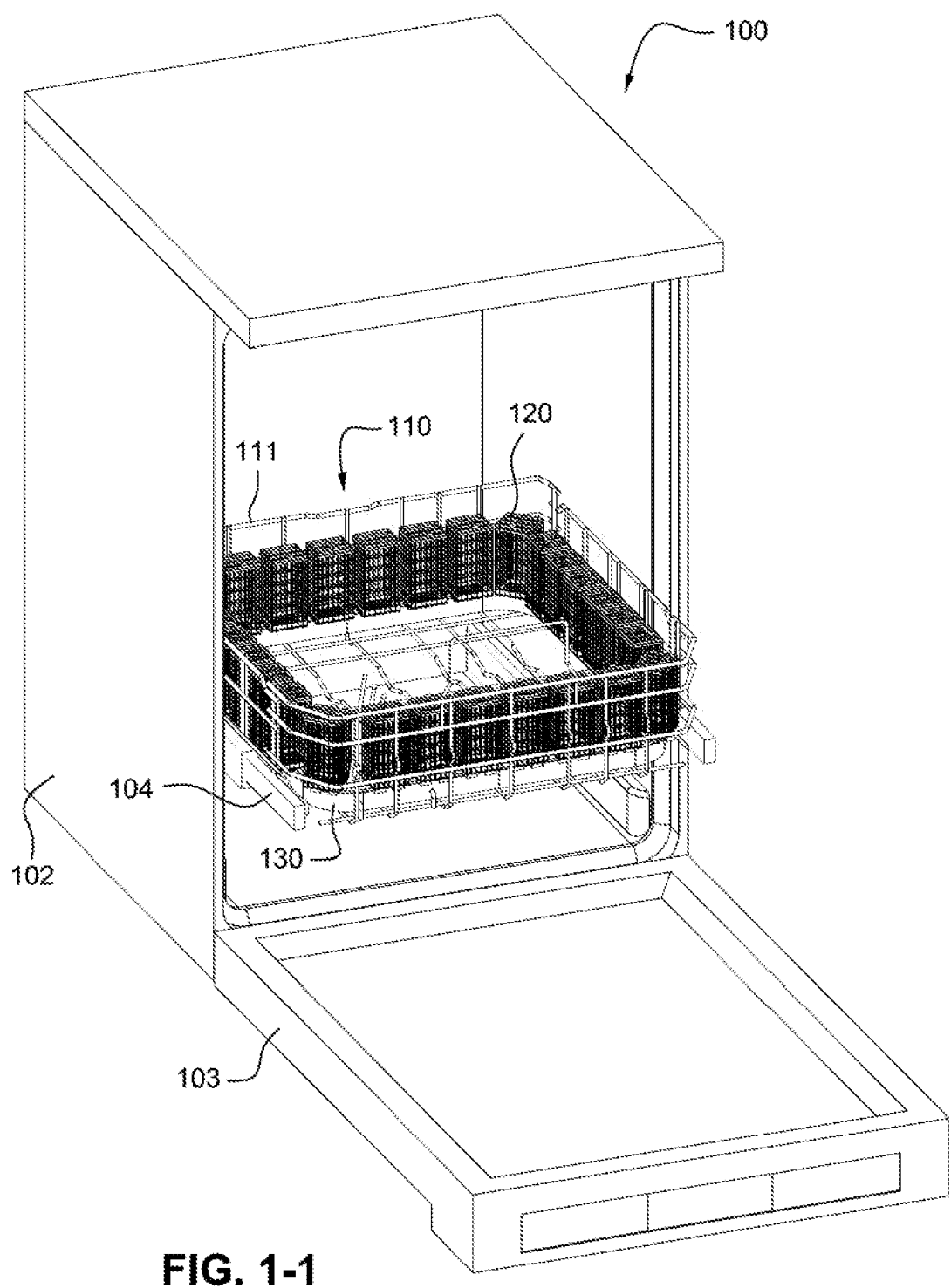
FIG. 1-1 is a perspective view of a dishwasher having a rack in accordance with an example of the disclosed technology.

Referring to FIG. 1-1, a dishwasher 100 is shown. The dishwasher includes a housing 102 and a door 103 pivotably coupled to the housing. A dishwasher rack 110 is slidably or rollably received in the housing 102 on slides 104 and/or wheels, as is known in the art. The rack 110 includes a frame 111 for supporting crockery items.

Figures 1, 2:
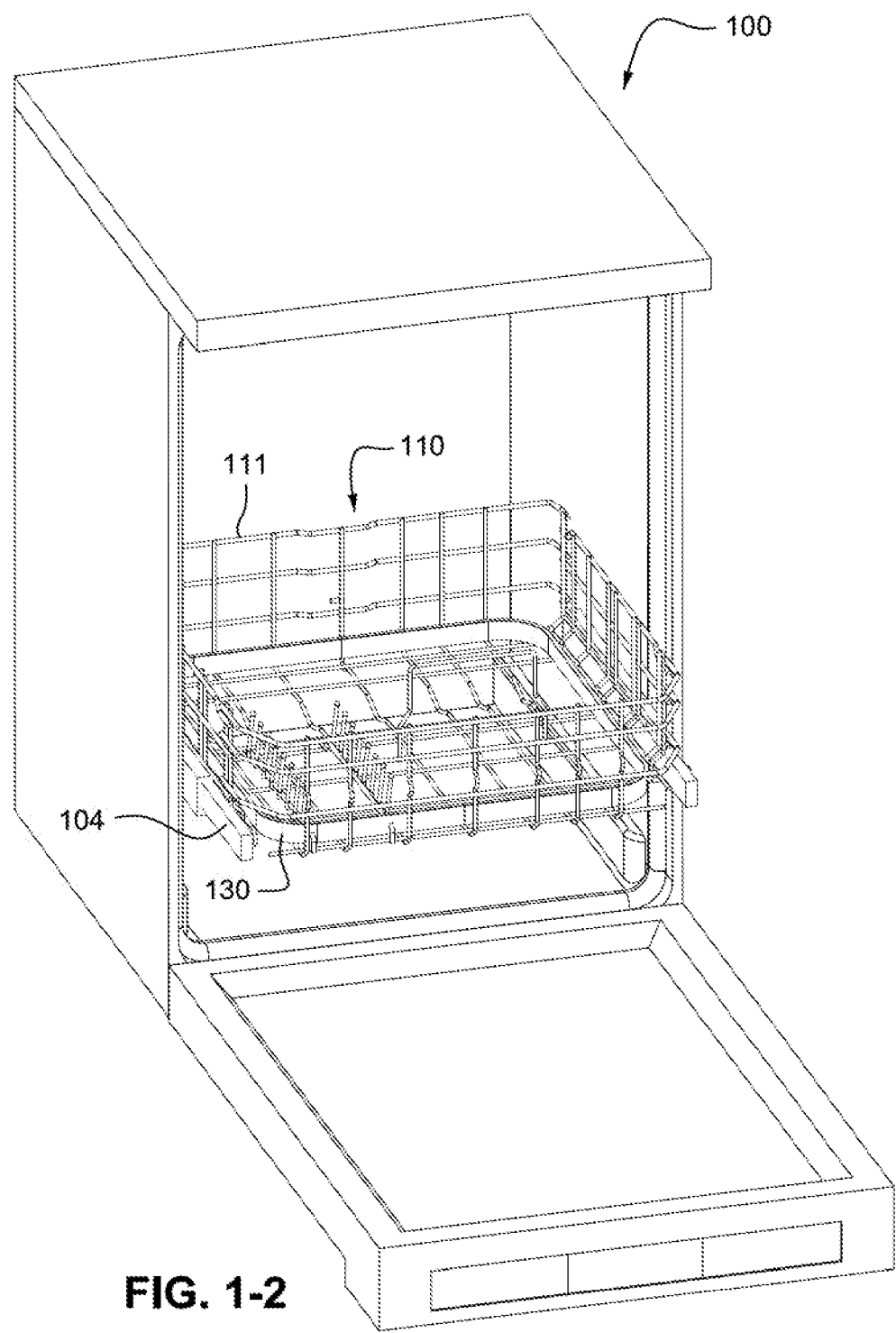

The frame 111 includes a bottom portion and at least one side (e.g. two or more, e.g., four sides). The sides of the frame may be portions of the frame that extend vertically from the bottom of the frame, as shown in FIGS. 1-1 and 1-2. Alternatively, vertical portions may be omitted and the sides of the frame may simply comprise a perimeter portion of the bottom of the frame. Those skilled in the art will recognize that the vertical portions may be provided on some sides of the frame and omitted on other sides.

At least one cutlery basket 120 may be disposed along a perimeter of the rack 110 (a plurality of cutlery baskets is shown in FIG. 1-1). That is, the cutlery baskets 120 may be arranged to extend along the sides of the frame 111. In the illustrated example of FIG. 1-1, the cutlery baskets 120 are provided along all sides of the frame 111. However, the rack 110 may be configured in any number of arrangements to provide a desired ratio of crockery storage area to cutlery storage area. For instance, the cutlery baskets 120 may be provided along some sides of the frame while being omitted on other sides. Additionally, the cutlery baskets 120 may extend partially along the sides of the frame 111 to accomplish a desired configuration. It is also noted that the cutlery baskets 120 may be stacked to include more than one row of baskets along any particular side of the frame 111.

Figures 1, 2, 3:
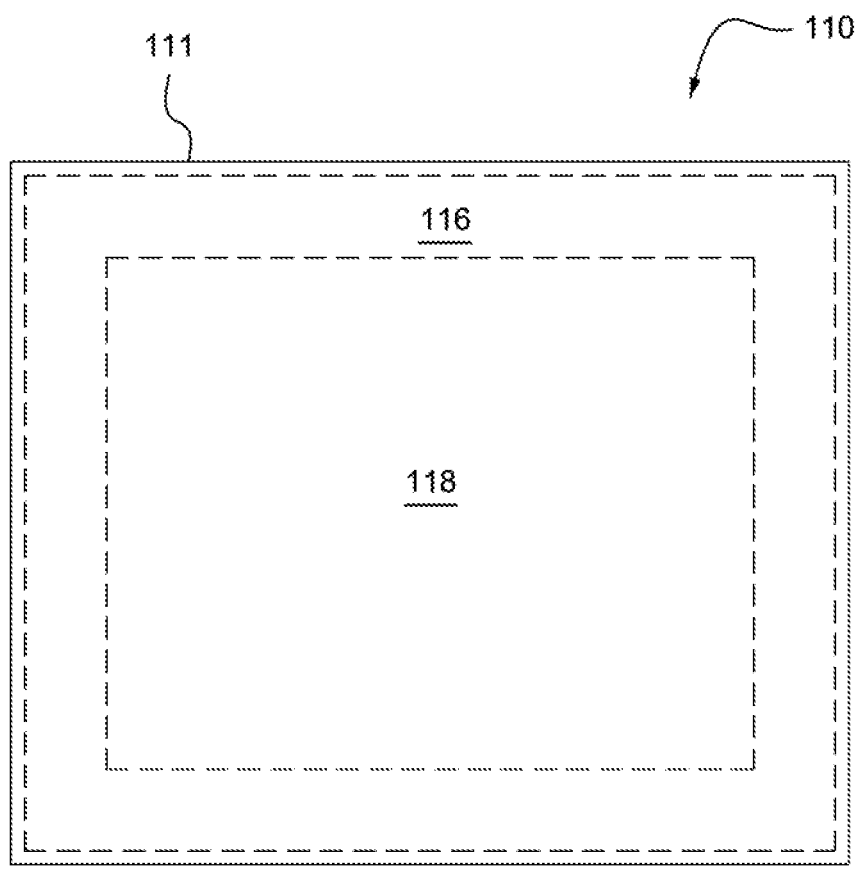
Figures 1, 2:
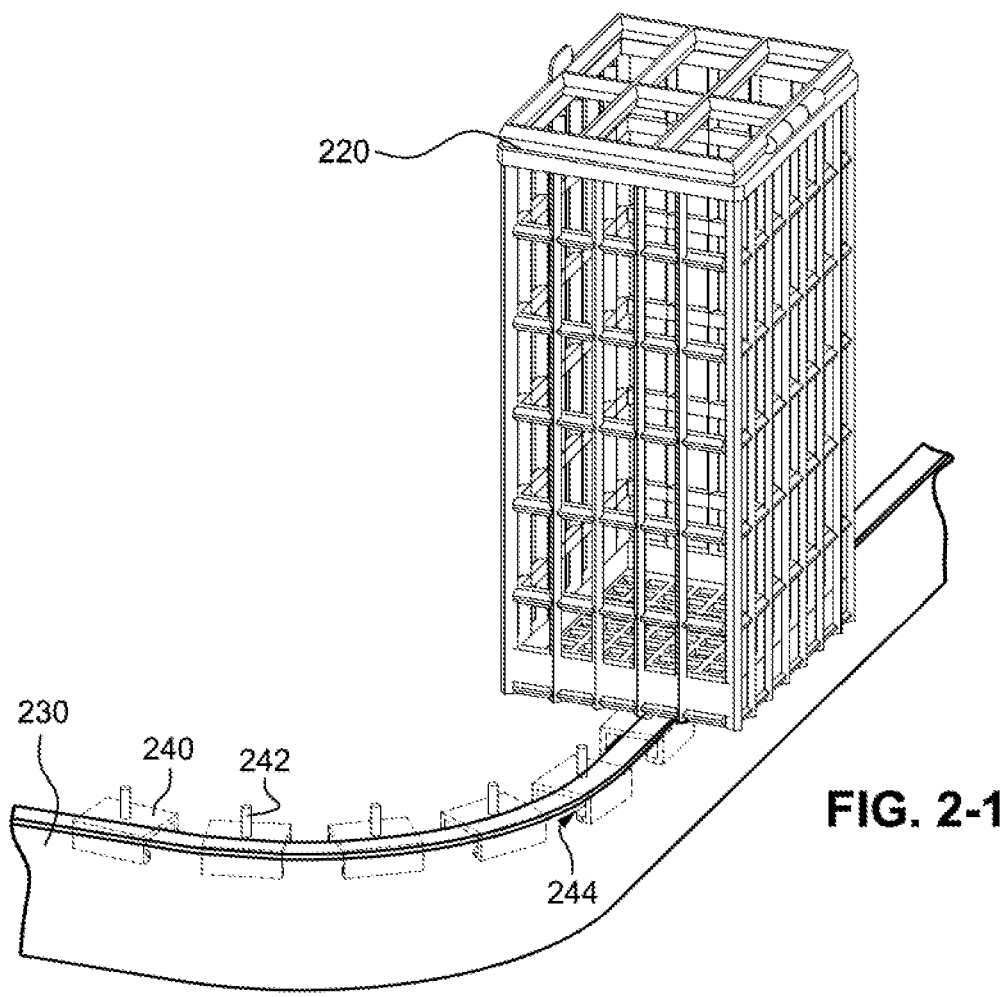
Figure 2:
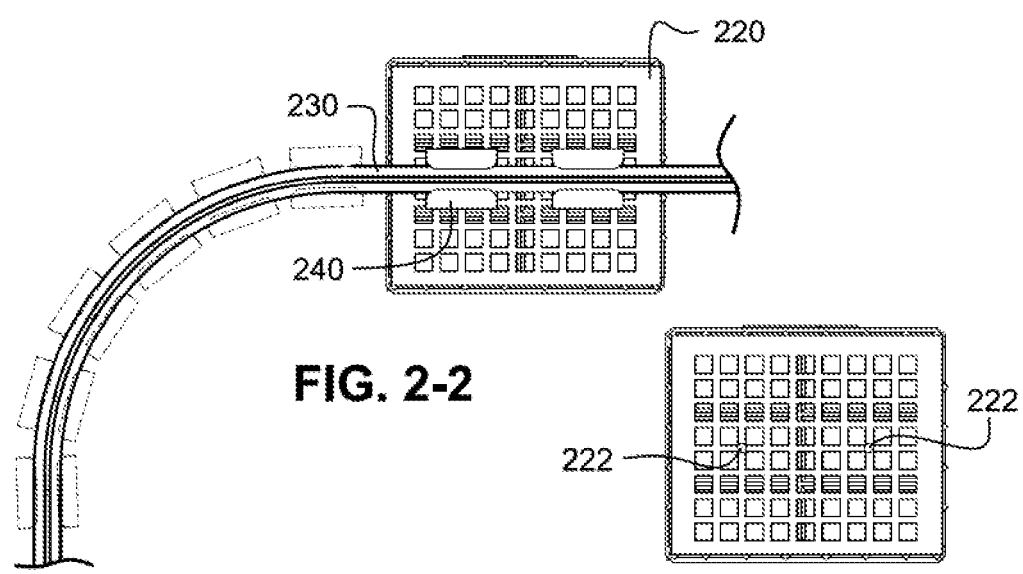
Figures 2, 3:
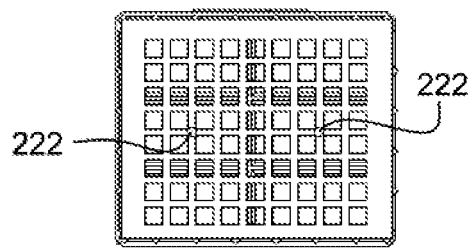
Figure 3:
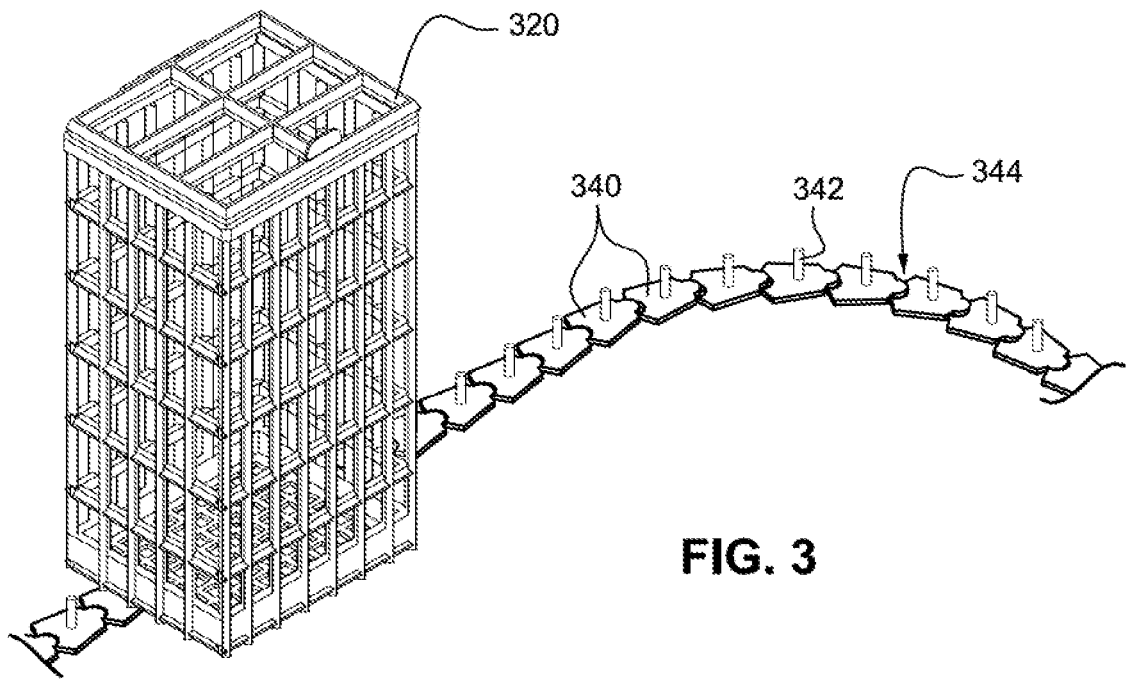

Turning to FIG. 1-3, a cutlery storage area 116 and a crockery storage area 118 in the rack 110 are shown. As illustrated, a cutlery storage area 116 may be arranged along a perimeter of the frame 111 and crockery storage area 118 may be arranged in a central portion of the frame such that the cutlery storage area 116 encloses the crockery storage area 118. However, as described above, cutlery baskets 120 may be added or removed to adjust the ratio of cutlery storage area 116 to crockery storage area 118 as desired.

It is also noted a range of cutlery baskets may be provided, e.g., cutlery baskets intended to accommodate specific types of cutlery items may be provided. That is, cutlery baskets having different structural arrangements may be interchangeable with one another such that cutlery baskets having different structural arrangements may be provided together in the rack.

Turning back to FIGS. 1-1 and 1-2, the cutlery baskets 120 may be configured to simply rest against the frame 11 of the rack 110 and may be removably insertable in the frame to provide a desired configuration of the cutlery baskets. Alternatively, as shown in FIGS. 1-1 and 1-2, a support rail 130 may be arranged in the frame 111 to support the cutlery baskets 120.

The rail 130 may extend along only one side of the frame 111, extend along a portion of a side of the frame, bridge sides of the frame, extend along any combination of portions of the sides of the frame, or form a loop extending along all sides of the frame. The rail 130 may be attached to the frame in any suitable manner. For example, the rail 130 may rest on the bottom of the frame 111 or may be mounted to the bottom and/or the sides of the frame. The rail 130 could be permanently fixed to the frame 111 or could be removably inserted in the frame.

The cutlery baskets may rest on the rail 130 (e.g., with a cutout on an underside of the baskets or with a locating feature (e.g., a peg)). The cutlery baskets could also be removably connected to the rail 130 with, for example, a clip or snap-fit connector.

In another example, the cutlery baskets may be configured to be movable along the rail 130 which may be configured as a guide. In this manner, a user may load cutlery items into baskets adjacent the door 102 of the dishwasher and then push those baskets along the rail to bring other baskets to positions adjacent the door for loading with cutlery items.

As shown in FIGS. 1-1 and 1-2, the rail 130 may have curved portions at corners of the rack 110 to facilitate movement of the cutlery baskets along the rail.

A variety of mechanisms may be employed to enable movement of the cutlery baskets 120 along the rail 130. Examples of such mechanisms are described below in reference to FIGS. 2-1 to 9.

Referring to FIGS. 2-1 to 2-3, a cutlery basket 220 is arranged to slide along a rail 230 (e.g., a T-shaped rail). A plurality of carriers 240 may be slidably arranged on the rail. The carriers 240 may have a C-shaped cross-section defining a channel 244 that receives a portion of the rail. A pin 242 may extend upwardly from each channel to be received in a hole 222 formed in an underside of the basket. The pin 242 is rotatably relative to the basket to facilitate movement of the basket along the rail, particularly along curved portions of the rail. A single carrier 240 may be coupled to a respective basket, or a plurality of carriers 240 may be coupled to the same basket.

Referring to FIG. 3, a basket 320 is coupled to a chain of carriers 340 connected to one another by ball and socket joints 344 (or joints pivotable in at least one plane) such that each carrier is pivotable relative to an adjacent carrier. Each carrier 340 may have a pin 342 arranged to be received in a hole in the basket. Similar to the arrangement in FIG. 2-1, a single carrier 340 may be coupled to a respective basket, or a plurality of carriers 340 may be coupled to the same basket. The carriers 340 may be coupled to a rail for sliding movement thereon by any suitable structure, such as the C-shaped structure shown in FIG. 2-1.

Figure 4:
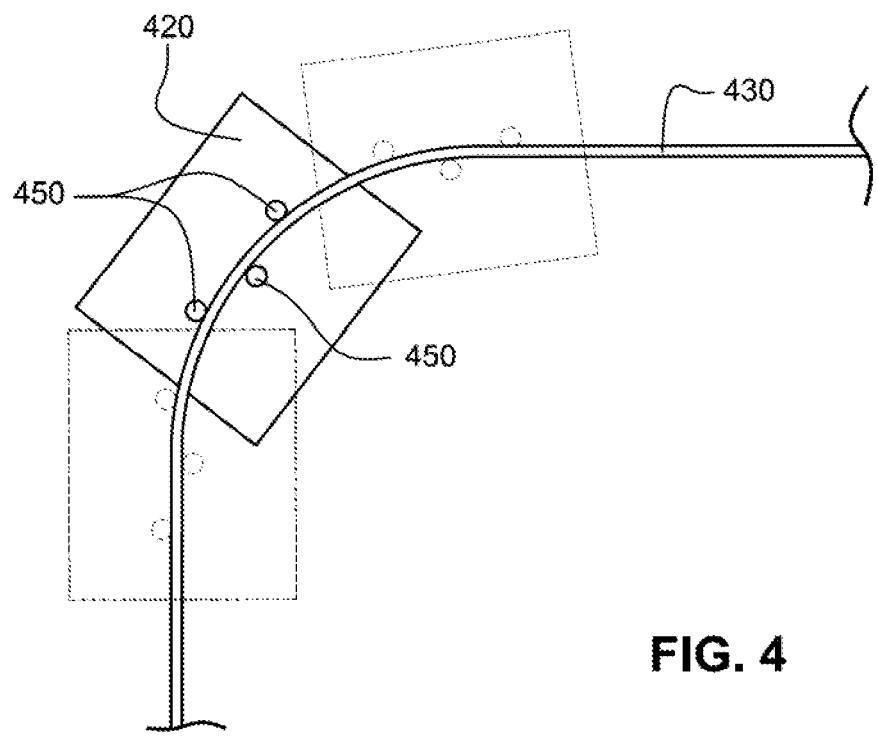
FIG. 4 is a bottom view of a cutlery basket and rail in accordance with an example of the disclosed technology.

Referring to FIG. 4, a basket 420 is arranged to slide along a rail 430. A plurality of wheels 450 or pegs may be disposed on a bottom of the basket and arranged to roll or slide against the rail 450. The wheels 450 or pegs are offset such that some of the wheels or pegs are disposed on an opposite side of the rail 450 than others of the wheels or pegs. This facilitates movement of the basket around a curved portion of the rail 450 while ensuring that the basket does not slide off of the rail.

Figure 5:
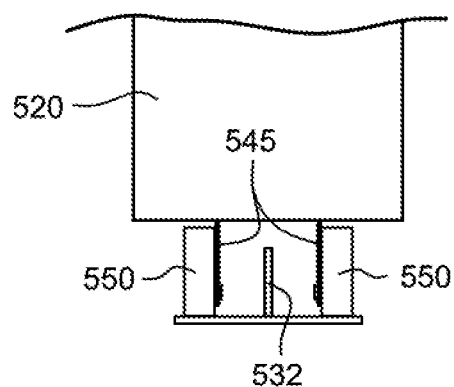
FIG. 5 is a front view of a cutlery basket and rail in accordance with an example of the disclosed technology.

Referring to FIG. 5, a basket 520 is arranged to roll along a rail 530. The rail may be arranged, for example, as an inverted T-shaped rail having a horizontal portion and a vertical leg 532. The basket 520 may be provided with a pair of wheels 550 coupled to the basket by wheel supports 545. The wheels 550 may be arranged on opposite sides of the vertical leg 532 and configured to roll along the horizontal portion of the rail 530. The vertical leg 532 may prevent the interiorly oriented wheel from rolling off of the rail.

Figures 1, 6:
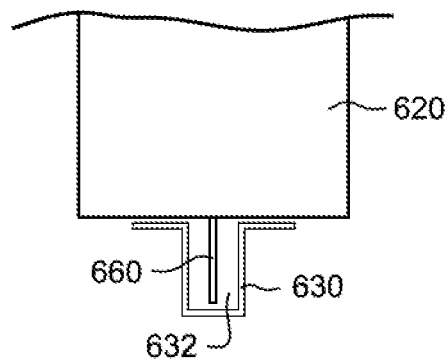
Figures 2, 6:
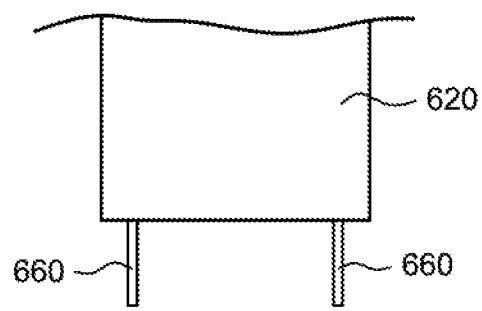

Referring to FIGS. 6-1 and 6-2, a basket 620 is arranged to slide along a rail 630. The rail 630 may be configured as a U-shaped rail having a channel 632 formed therein. A guide pin 660 may depend from an underside of the basket to be received in the channel 632 for sliding movement therealong. As shown in FIG. 6-2, a plurality of guide pins (e.g., two) may extend from the basket at spaced locations to enable movement along curved portions of the rail.

Figure 7:
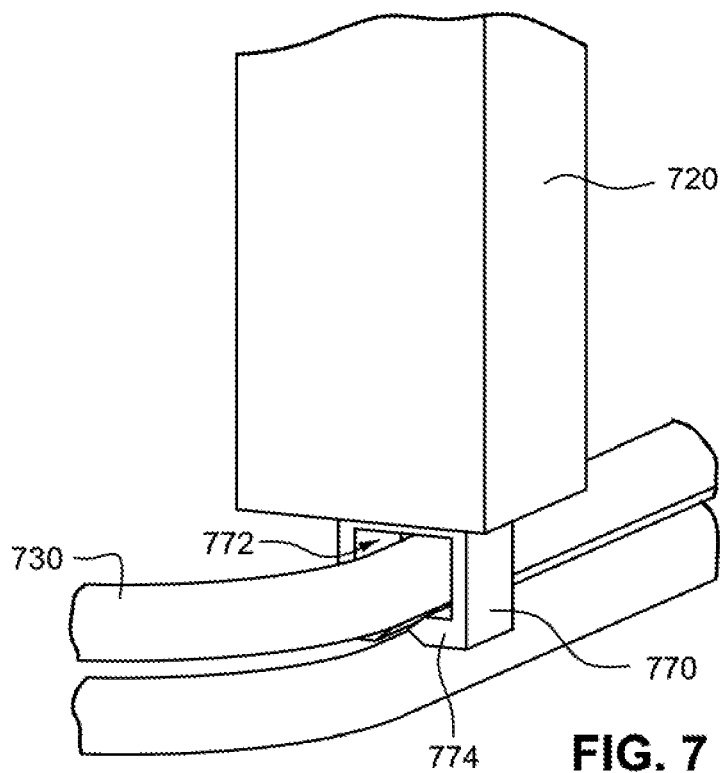
FIG. 7 is a perspective view of a cutlery basket and rail in accordance with an example of the disclosed technology.

Referring to FIG. 7, a basket 720 is arranged to slide along a rail 730. A snap-fit connector may be coupled to the basket and arranged to connect with the rail. The connector 770 may include a pair of resilient arms 774 having inclined portions configured to engage the rail to enable attachment and removal of the connector to the rail, as those skilled in the art will understand. The arms 774 define a guide channel 772 that receives the rail.

The rails described herein may be embodied as elongate rails, rods, flat rails or any other suitable configuration. The rails may be formed from metal, plastic, composite or any other suitable material. Additionally, the examples described herein as having a sliding arrangement may instead include wheels, ball-bearings or any other suitable structure to provide a rolling engagement. Likewise, the disclosed examples having a rolling arrangement may instead be configured as sliding arrangements. Also, any of the examples may be provided with ball-bearings (e.g., in the carriers, connectors, wheels, pegs, etc.) to facilitate smoother movement. Furthermore, instead of the carriers, guide pins, wheels, pegs and/or connectors etc. which extend from or are connected to the basket, structure for engaging a rail may be incorporated into the basket.

Figure 8:
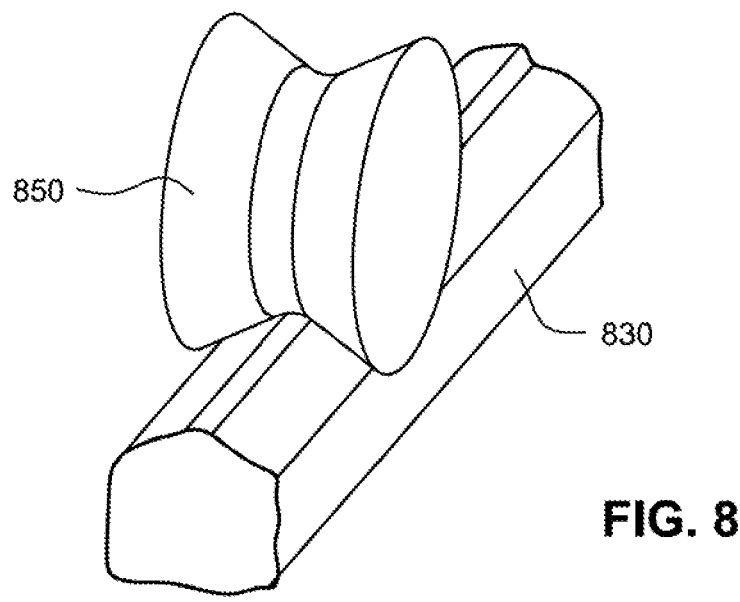
FIG. 8 is a perspective view of a wheel and rail in accordance with an example of the disclosed technology.
Figure 9:
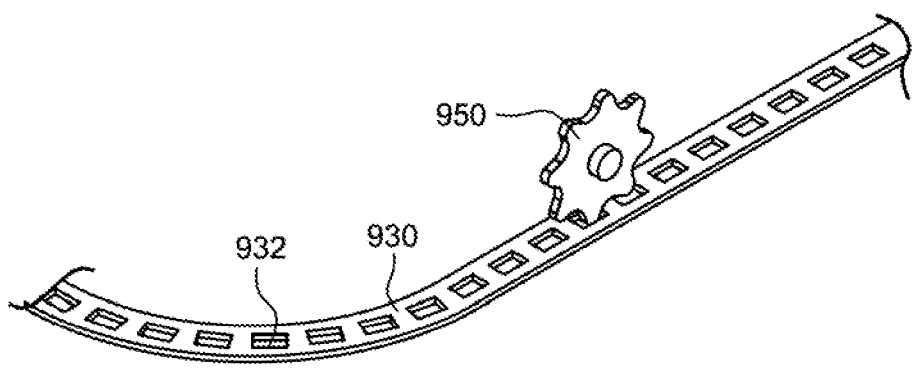
FIG. 9 is a perspective view of a wheel and rail in accordance with an example of the disclosed technology.

Referring to FIG. 8, a wheel 850 having a V-shaped groove is shown. The V-shaped groove is arranged to mate with a rail 830 having a corresponding wedge shape. Turning to FIG. 9, a rail 930 having a plurality of recesses formed therein is shown. A wheel configured as a sprocket with teeth is arranged to engage the rail. Such wheels and/or rails may be incorporated into any of the disclosed examples.

While the technology has been described in connection with what are presently considered to be the most practical and preferred examples, it is to be understood that the technology is not to be limited to the disclosed examples, but on the contrary, is intended to cover various modifications and equivalent arrangements included within the spirit and scope of the disclosure.

What is claimed is:

1. A cutlery basket assembly, comprising:
    a support rail configured to extend along at least a first side and a second side of a dishwasher rack such that the rail includes a first straight portion corresponding to the first side of the rack and a second straight portion corresponding to the second side of the rack, the first straight portion of the rail being perpendicular to the second straight portion of the rail, with the first straight portion of the rail and the second straight portion of the rail being joined together by a curved portion of the rail; and
    at least one cutlery basket coupled to the rail and arranged to revolve along an inner perimeter of the rack so as to be movable along the rail from the first straight portion of the rail to the second straight portion of the rail without disengaging from the rail as the at least one cutlery basket moves from the first straight portion of the rail to the second straight portion of the rail or vice versa,
    wherein the at least one cutlery basket comprises an open-mesh grid enclosure formed with grid bars in order to facilitate passage of water while accommodating cutlery items to be cleaned.

2. The cutlery basket assembly according to claim 1, wherein the at least one cutlery basket is a plurality of cutlery baskets.

3. The cutlery basket assembly according to 2, wherein the rail forms a loop within the rack, and the plurality of cutlery baskets is arranged to revolve along the loop.

4. The cutlery basket assembly according to claim 3, wherein the rail is a U-shaped rail having a slot formed therein, and
    wherein at least one guide pin is coupled to each cutlery basket and is arranged to extend into the slot.

5. The cutlery basket assembly according to claim 3, further comprising a plurality of snap-fit connectors coupled respectively to the plurality of cutlery baskets, the rail being formed as an elongate rail, and
    wherein each snap-fit connector is configured to be removably connected to the elongate rail.

6. The cutlery basket assembly according to claim 5, wherein each snap-fit connector includes a pair of resilient arms defining a guide channel arranged to receive the elongate rail for sliding movement therewithin.

7. The cutlery basket assembly according to claim 2, wherein the plurality of cutlery baskets includes a first cutlery basket and second cutlery basket, wherein the first cutlery basket has a different structural arrangement than the second cutlery basket.

8. A cutlery basket assembly, comprising:
    a support rail configured to extend along at least a first side and a second side of a dishwasher rack such that the rail includes a first straight portion corresponding to the first side of the rack and a second straight portion corresponding to the second side of the rack, the first straight portion of the rail being perpendicular to the second straight portion of the rail, with the first straight portion of the rail and the second straight portion of the rail being joined together by a curved portion of the rail; and
    at least one cutlery basket coupled to the rail and arranged to revolve in the rack so as to be movable along the rail from the first straight portion of the rail to the second straight portion of the rail,
    wherein the at least one cutlery basket comprises an open-mesh grid enclosure formed with grid bars in order to facilitate passage of water while accommodating cutlery items to be cleaned,
    wherein the at least one cutlery basket is a plurality of cutlery baskets,
    wherein the rail forms a loop within the rack, and the plurality of cutlery baskets is arranged to revolve along the loop,
    wherein the rail is a U-shaped rail having a slot formed therein, and
    wherein at least one guide pin is coupled to each cutlery basket and is arranged to extend into the slot.

9. A cutlery basket assembly, comprising:
    a support rail configured to extend along at least a first side and a second side of a dishwasher rack such that the rail includes a first portion corresponding to the first side of the rack and a second portion corresponding to the second side of the rack; and
    at least one cutlery basket coupled to the rail and arranged to revolve in the rack so as to be movable along the rail from the first portion of the rail to the second portion of the rail,
    wherein the at least one cutlery basket is a plurality of cutlery baskets,
    wherein the rail forms a loop within the rack, and the plurality of cutlery baskets is arranged to revolve along the loop,
    further comprising a plurality of snap-fit connectors coupled respectively to the plurality of cutlery baskets, the rail being formed as an elongate rail,
    wherein each snap-fit connector is configured to be removably connected to the elongate rail, and
    wherein each snap-fit connector includes a pair of resilient arms defining a guide channel arranged to receive the elongate rail for sliding movement therewithin.

* * * * *